US009760347B2

(12) United States Patent
Wang et al.

(10) Patent No.: US 9,760,347 B2
(45) Date of Patent: Sep. 12, 2017

(54) METHOD AND SYSTEM TO IDENTIFY GUI OBJECTS FOR NON-MARKUP-LANGUAGE-PRESENTED APPLICATIONS

(75) Inventors: Cheng Wang, Beijing (CN); Kevin R. Walsh, Redwood City, CA (US); Pascal P. Sero, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1777 days.

(21) Appl. No.: 12/501,016

(22) Filed: Jul. 10, 2009

(65) Prior Publication Data

US 2010/0175055 A1 Jul. 8, 2010

Related U.S. Application Data

(60) Provisional application No. 61/143,067, filed on Jan. 7, 2009, provisional application No. 61/134,070, filed on Jan. 7, 2009.

(51) Int. Cl.
*G06F 9/45* (2006.01)
(52) U.S. Cl.
CPC ..................................... *G06F 8/42* (2013.01)
(58) Field of Classification Search
CPC ........................................................ G06F 9/45
USPC ................................................ 717/136–167
See application file for complete search history.

(56) References Cited

U.S. PATENT DOCUMENTS

| | | | |
|---|---|---|---|
| 7,653,721 B1 * | 1/2010 | Romanov et al. | 709/224 |
| 2004/0015783 A1 * | 1/2004 | Lennon et al. | 715/523 |
| 2004/0249844 A1 * | 12/2004 | Kotani | 707/100 |
| 2005/0166254 A1 * | 7/2005 | Borden et al. | 725/134 |
| 2005/0187912 A1 * | 8/2005 | Matsa et al. | 707/3 |
| 2005/0273768 A1 * | 12/2005 | Doughan | G06F 8/30 717/136 |
| 2006/0015816 A1 * | 1/2006 | Kuehner | G06F 17/30908 715/744 |
| 2006/0156287 A1 * | 7/2006 | Vikram | G06F 11/3684 717/124 |
| 2008/0126390 A1 * | 5/2008 | Day | G06F 11/3688 |
| 2009/0171931 A1 * | 7/2009 | Avitzur et al. | 707/5 |
| 2009/0210749 A1 * | 8/2009 | Hayutin | 714/38 |
| 2010/0146420 A1 * | 6/2010 | Bharadwaj et al. | 715/764 |

* cited by examiner

*Primary Examiner* — Jae Jeon
(74) *Attorney, Agent, or Firm* — Shun Yao; Park, Vaughan, Fleming & Dowler LLP

(57) ABSTRACT

One embodiment of the present invention provides a system that facilitates identifying objects rendered on a graphic user interface (GUI) in a non-markup-language-presented software application. During operation, the system receives a non-markup-language-presented application at a computer. The system first selects a set of attributes that uniquely distinguish a target GUI object. The system then identifies a set of target GUI objects in the application, wherein a respective GUI object is not represented in a markup language in the received application. Next, the system represents the target GUI objects in the application with a markup-language-based structure, wherein each target GUI object is associated with a corresponding markup-language node in the structure.

16 Claims, 12 Drawing Sheets

```xml
<?xml version="1.0" encoding="utf-8" ?>
<oracleForms awtComponentClass="oracle.forms.engine.Main" handlerClass="" testComponentClass="oracle.oardc.atck.forms.test.OracleForms">
  <textField awtComponentClass="oracle.forms.ui.VTextField" handlerClass="oracle.forms.handler.TextFieldItem"
    name="GROUPS_SWITCHER_0" prompt="" testComponentClass="oracle.oardc.atck.forms.test.TextField" />
  <textField awtComponentClass="oracle.forms.ui.VTextField" handlerClass="oracle.forms.handler.TextFieldItem"
    name="GROUPS_SWITCHER_1" prompt="" testComponentClass="oracle.oardc.atck.forms.test.TextField" />
  <textField awtComponentClass="oracle.forms.ui.VTextField" handlerClass="oracle.forms.handler.TextFieldItem"
    name="GROUPS_SWITCHER_2" prompt="" testComponentClass="oracle.oardc.atck.forms.test.TextField" />
  <textField awtComponentClass="oracle.forms.ui.VTextField" handlerClass="oracle.forms.handler.TextFieldItem"
    name="GROUPS_SWITCHER_3" prompt="" testComponentClass="oracle.oardc.atck.forms.test.TextField" />
  <formWindow awtComponentClass="oracle.forms.ui.ExtendedFrame" handlerClass="oracle.forms.handler.FormWindow"
    name="ITEM_REVERSAL" testComponentClass="oracle.oardc.atck.forms.test.FormWindow" />
  <formWindow awtComponentClass="oracle.forms.ui.ExtendedFrame" handlerClass="oracle.forms.handler.FormWindow"
    name="GROUP_REVERSE" testComponentClass="oracle.oardc.atck.forms.test.FormWindow" />
  ...
- <formWindow awtComponentClass="oracle.forms.ui.ExtendedFrame" handlerClass="oracle.forms.handler.FormWindow"   ⎯1004
    name="GROUPS_SUMMARY" testComponentClass="oracle.oardc.atck.forms.test.FormWindow">
    <tabbedRegion awtComponentClass="oracle.forms.ui.FormsTabPanel" handlerClass="oracle.forms.handler.TabControl" label="Created"   ⎯1002
      name="GROUPS_SUMMARY_TAB" testComponentClass="oracle.oardc.atck.forms.test.TabbedRegion" />
  </formWindow>
  <formWindow awtComponentClass="oracle.forms.ui.ExtendedFrame" handlerClass="oracle.forms.handler.FormWindow"
    name="GROUPS_QF" testComponentClass="oracle.oardc.atck.forms.test.FormWindow" />
  <formWindow awtComponentClass="oracle.forms.ui.ExtendedFrame" handlerClass="oracle.forms.handler.FormWindow"
    name="SIGNON_WINDOW" testComponentClass="oracle.oardc.atck.forms.test.FormWindow" />
  <formWindow awtComponentClass="oracle.forms.ui.ExtendedFrame" handlerClass="oracle.forms.handler.FormWindow"
    name="ExtendedFrame9" testComponentClass="oracle.oardc.atck.forms.test.FormWindow" />
</oracleForms>
```

FIG. 10

METHOD AND SYSTEM TO IDENTIFY GUI OBJECTS FOR NON-MARKUP-LANGUAGE-PRESENTED APPLICATIONS

RELATED APPLICATIONS

This application hereby claims priority under 35 U.S.C. §119 to U.S. Provisional Patent Application No. 61/143,067, filed on 7 Jan. 2009, entitled "METHOD AND MECHANISM TO IDENTIFY GUI OBJECTS FOR NON-MARKUP LANGUAGE PRESENTED APPLICATIONS," by inventor Cheng Wang, Kevin Walsh and Pascal Sero, and to U.S. Provisional Patent Application No. 61/134,070, filed on 7 Jan. 2009, entitled "METHOD AND SYSTEM TO AUTOMATICALLY GENERATE GUI OBJECT ADDRESSING QUERIES," by inventor Cheng Wang, Kevin Walsh and Pascal Sero.

BACKGROUND

Field

The present disclosure relates to GUI object identification. More specifically, the present disclosure relates to identifying GUI objects for non-markup-language-presented applications.

Related Art

As the demand for high-quality software increases, software testing plays an increasingly critical role in the software industry. In order to test graphical user interface (GUI) of a software application, a tester usually has to manually repeat actions on the GUI. This process can be tedious and costly. Ever since the automated GUI testing tool was introduced, time and effort spent on software testing have been greatly reduced. However, one of the key barriers for large-scale deployment of automated GUI testing tools is how to identify GUI objects quickly and correctly, especially for non-markup-language-presented applications, or so-called "native applications."

A GUI object can be identified by its attributes. An application that is not presented on a display based on a markup language, such as Extensible Markup Language (XML), is called a non-markup-language-presented application. Conventionally, identification of GUI objects for non-markup-language-presented applications involves manually documenting attributes or properties of each GUI object. The attributes of each GUI object is then stored in an object repository. During the GUI-object identification process, a target GUI object can be identified by comparing the attributes of the target object with the attributes stored in the object repository.

However, these conventional GUI-object identification methods have several limitations. First, because no standard has been established for building the object repository, different implementations follow different rules to generate the object repository. The internal organization of different object repositories can be complex and implementation-dependent. Searching or addressing objects in the object repository can be difficult due to the lack of standard internal organization. Since a GUI object can only be identified by comparing its attributes, it is difficult to implement complex object-addressing functions such as addressing by the object hierarchy. In addition, the indispensable object repository increases the complexity of tool migration and maintenance. For example, with any GUI object change in the software application, the object repository often needs to be updated accordingly. When a tester applies an object identification result to another application, he or she typically has to first adapt all the related object repository files to the new application. As the number and size of repository files increase, the maintenance cost increases, and the maintenance itself becomes more difficult.

SUMMARY

One embodiment of the present invention provides a system that facilitates identifying objects rendered on a graphic user interface (GUI) in a non-markup-language-presented software application. During operation, the system receives a non-markup-language-presented application at a computer. The system first selects a set of attributes that uniquely distinguish a target GUI object. The system then identifies a set of target GUI objects in the application, wherein a respective GUI object is not represented in a markup language in the received application. Next, the system represents the target GUI objects in the application with a markup-language-based structure, wherein each target GUI object is associated with a corresponding markup-language node in the structure.

In a variation on this embodiment, the system generates an addressing query for a respective node to be identified in the represented markup-language structure. The system further identifies a GUI object based at least on the association between the target GUI object and its corresponding markup-language node by issuing the addressing query to the markup-language structure.

In a variation on this embodiment, the system records user actions performed on the target GUI objects.

In a variation on this embodiment, the non-markup-language-presented application is not rendered on the GUI based on a markup language.

In a variation on this embodiment, the system represents the set of target GUI objects by first determining a context root for the application. Next, the system converts the context root to a markup-language root node. The system then forms a hierarchy of nodes that can be queried. To do so, the system recursively traverses the target GUI objects and converts a respective target GUI object to a markup-language node.

In a further variation, the conversion of the target GUI object to a markup-language node involves naming the node with the name of the GUI object and setting attributes for the node based at least on class information and properties of the target GUI object.

In a further variation, the target GUI object is a container type object that contains other GUI objects.

In a variation on this embodiment, the system builds an association map which maps a GUI object to its corresponding markup-language node.

BRIEF DESCRIPTION OF THE FIGURES

FIG. 10 presents an exemplary XML document illustrating the converted markup-language nodes in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

In order to automatically test GUI of software applications by a computer, a human tester's actions are usually recorded first and later played back by the computer. The major hurdle in testing a non-markup-language-presented application is that the computer must identify which action the tester performs and, more importantly, on which GUI object the tester performs an action. Hence, a GUI object identification method for non-markup-language-presented applications, or so-called native applications, is introduced.

Embodiments of the present invention provide a method for identifying GUI objects in a non-markup-language-presented application which can be any native application, such as a Java™ (a trademark of Sun Microsystems, Inc.) application or a WIN32 application, which is not rendered based on a markup language, such as XML. Unlike the conventional methods, the current invention does not require building an object repository based on GUI object attributes. Instead, embodiments of the present invention utilize powerful markup languages and the corresponding query functions for identifying GUI objects in a non-markup-language-presented application.

Figure 1:
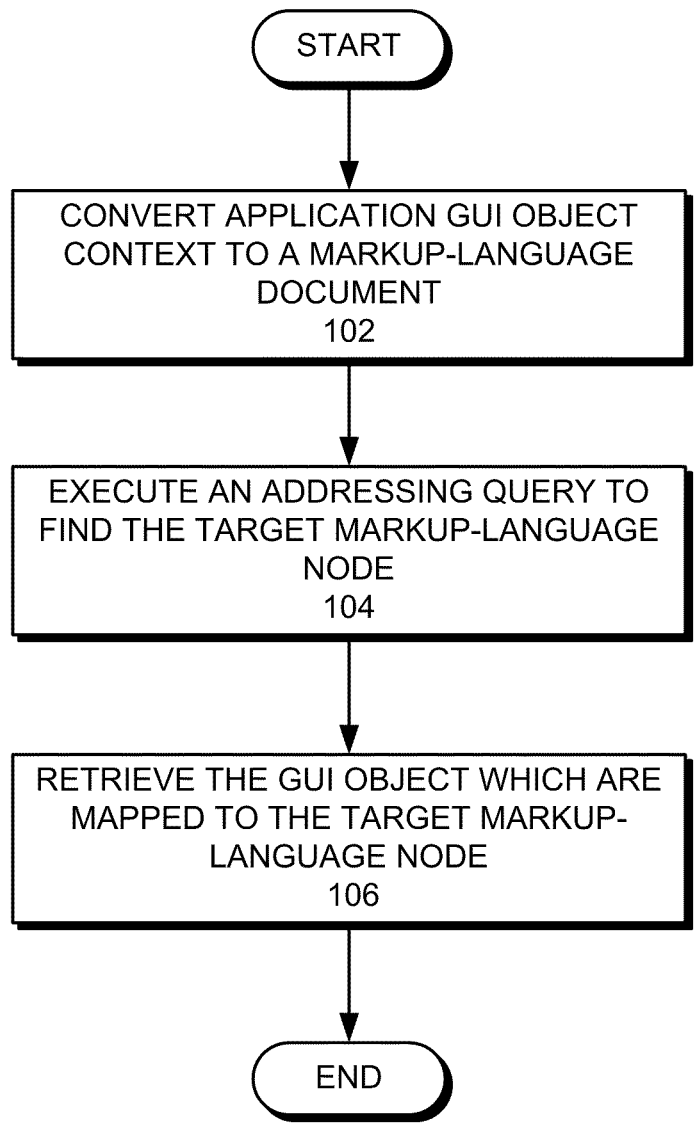
FIG. 1 presents a flow chart illustrating the high-level process of identifying GUI objects in a non-markup-language-presented application in accordance with one embodiment of the present invention.

FIG. 1 presents a flow chart illustrating the high-level process of identifying GUI objects in a non-markup-language-presented application. During operation, the system first converts the application's GUI objects context to a markup-language document (operation 102). To identify a target object, the system executes an addressing query to find the corresponding node in the markup-language document (operation 104), and then retrieve the GUI object that is mapped to the markup-language node (operation 106). By using addressing query of markup languages to identify GUI objects, the system can achieve unified addressing of GUI objects in non-markup-language-presented applications. Furthermore, a markup-language's hierarchical structure allows complex query functions such as querying according to the object hierarchy. The object identification script used in embodiments of the present invention is also much more flexible and efficient to maintain and migrate than an application-specific object repository.

In one embodiment, the GUI-object identification process can be divided into two phases, a distinguishing phase and an identifying phase. During the distinguishing phase, the system distinguishes a respective GUI object from other objects in the application and convert the GUI objects into nodes in a structured markup-language document. The system further record user operations on the GUI objects in a script, generate corresponding addressing queries to the markup-language nodes associated with those GUI objects, and record these addressing queries. Results from this phase, together with the addressing queries, are used to identify a target GUI object during the identifying phase. During the identifying phase, the script is played back to emulate the recorded user operations, and the corresponding address queries are executed against a markup-language document containing nodes associated with GUI objects. This way, the system can identify the GUI objects that have been previously operated on by the user, and repeat the same operations in the play-back.

Figure 2A:
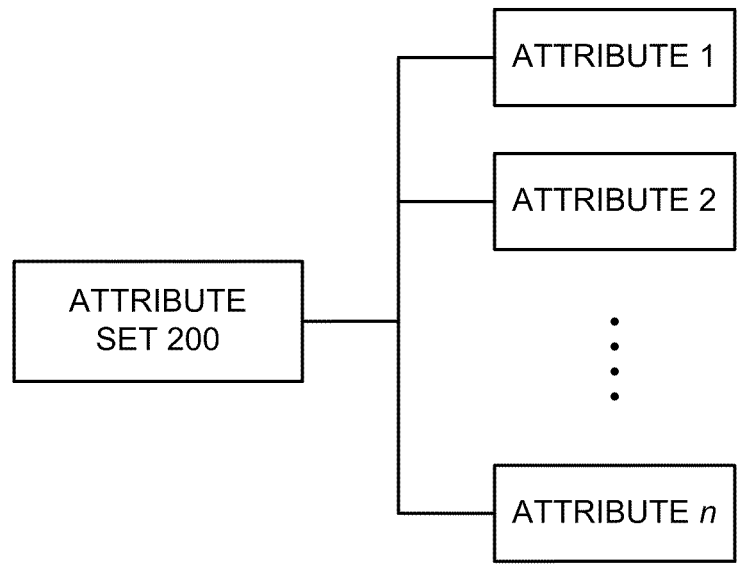
FIG. 2A illustrates an exemplary attribute set of a GUI object with n attributes in accordance with one embodiment of the present invention.

A GUI object may have many attributes. However, not all the attributes are necessary for distinguishing it from other objects in the application. For example, the coordinate attribute of a GUI object is typically not selected, because the position of an object often changes. During the distinguishing phase, a set of attributes are selected for uniquely distinguishing a respective GUI object. This attribute set can then be queried in the query language. FIG. 2A illustrates an exemplary attribute set 200 with n attributes for a GUI object. Preferably, the method does not choose those GUI attributes that vary often from time to time. However, the attributes in the selected set need not all remain constant as long as at least one of them can be used to distinguish the object from others.

Figure 2B:
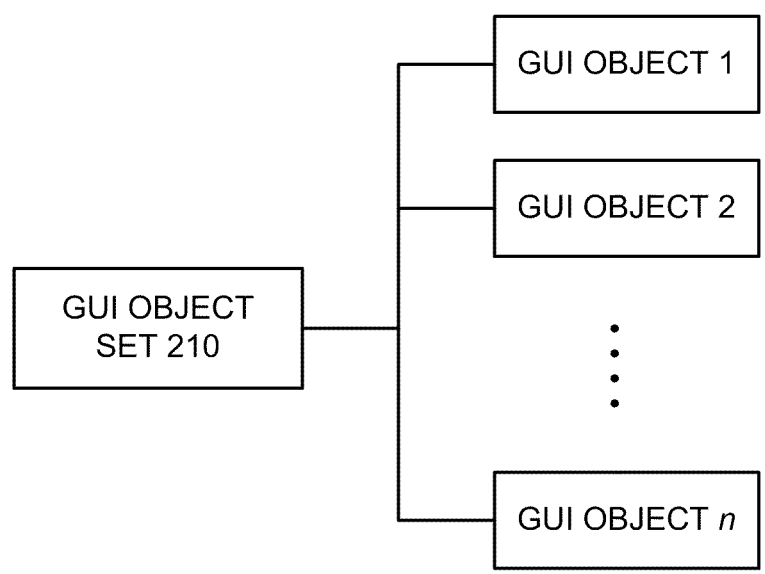
FIG. 2B illustrates an exemplary GUI object set with n objects for object identification in accordance with one embodiment of the present invention.

In addition, not all GUI objects in an application need to be identified. For example, certain GUI objects are only related to the layout of the application, and thus require no user action. In one embodiment, a subset of the GUI objects in the application is chosen as the identification target. These objects are considered meaningful objects on which a user may perform GUI actions. FIG. 2B illustrates a meaningful GUI object set 210 with n objects for an application. The process of selecting meaning objects and their associated attributes can be performed automatically based on a predetermined selection policy or performed manually by the tester.

Figure 3:
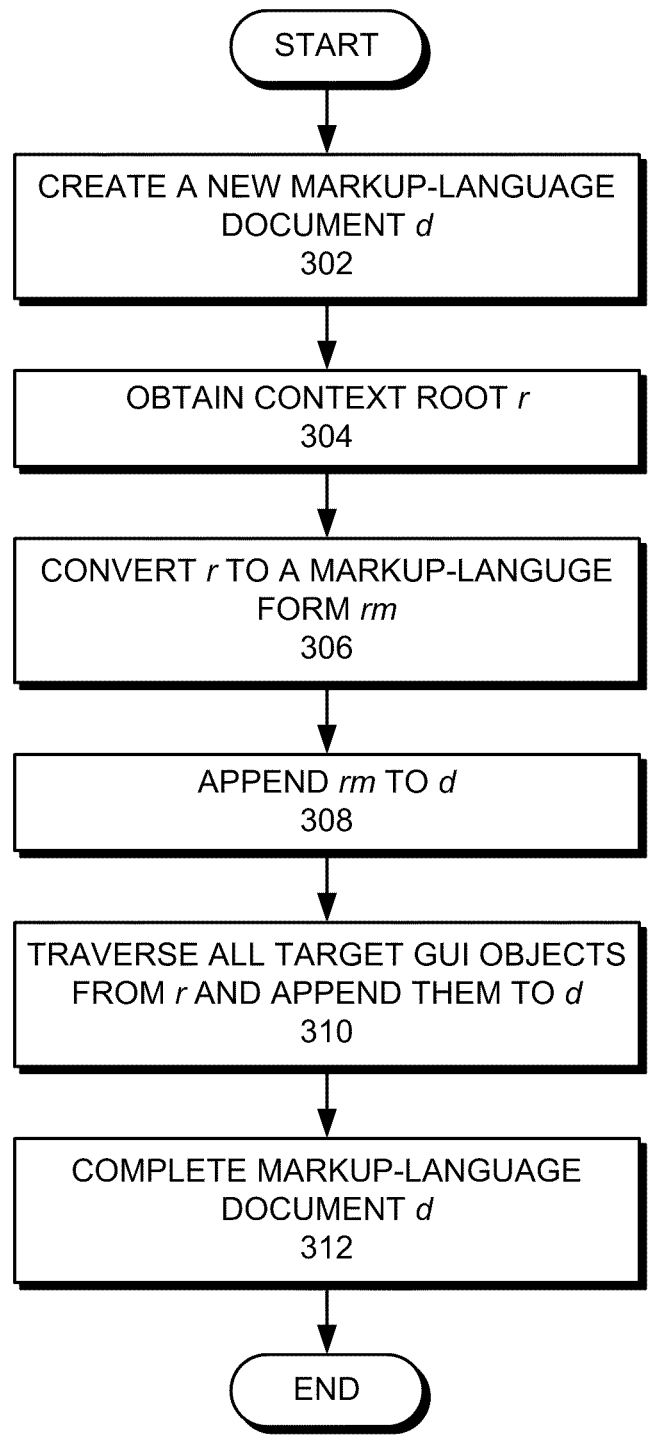
FIG. 3 presents a flow chart illustrating the process of creating a markup-language structure for GUI objects in a non-markup-language-presented application in accordance with one embodiment of the present invention.

Subsequently, the selected GUI objects in the application are represented in a markup-language structure. FIG. 3 presents a flow chart illustrating the process of creating a markup-language structure to represent GUI objects in a non-markup-language-presented application. During the process, a new markup-language document d, such as a blank Document Object Model (DOM) file, is created first (operation 302). The DOM is a cross-platform and language-independent standard for representing and interacting with HTML and XML objects. For a non-markup-language-presented application, a GUI-object context is always presented. The GUI-object context is the environment in which all user actions are performed to the application, such as the main workspace of a word processor application. The context root r which serves as the entry point of a hierarchy of GUI objects is obtained (operation 304). Next, context root r is converted to a markup-language form rm (operation 306) and appended to the newly created document d (operation 308). Through context root r the system traverses the selected GUI objects in the current context and converts them to markup-language forms, and appended to d (operation 310). Details of how each object is converted to a markup-language node and how the system traverses the objects are described in conjunction with FIG. 4 and FIG. 5. The markup-language document d is then successfully created (operation 312).

Figure 4:
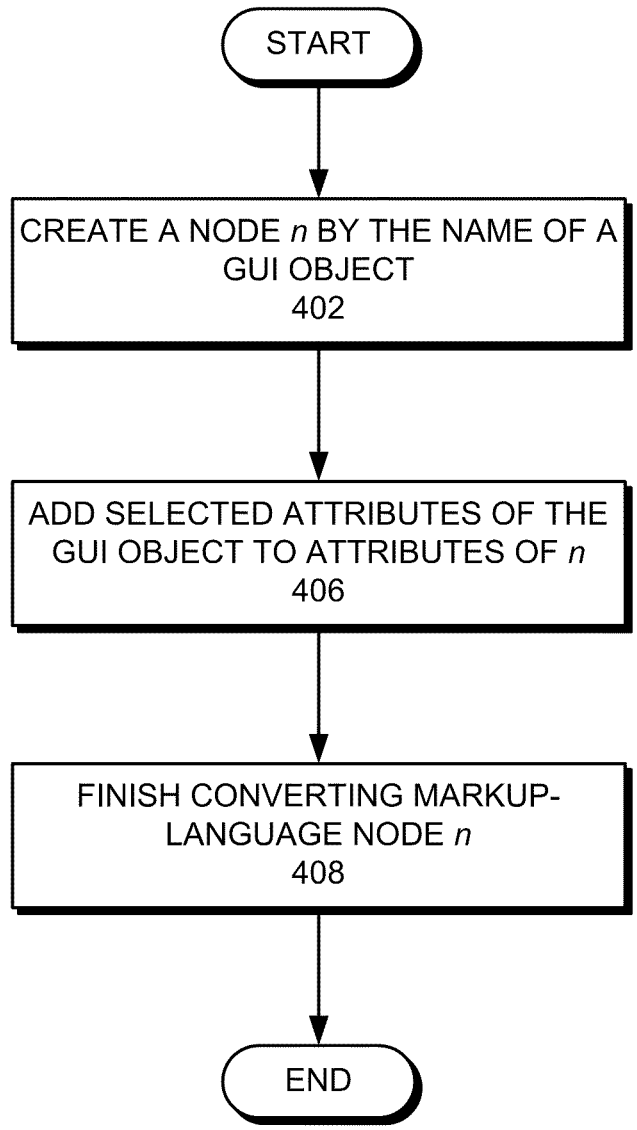
FIG. 4 presents a flow chart illustrating the process of representing a GUI object as a node in a markup-language document in accordance with one embodiment of the present invention.

The GUI-object identification process represents each target GUI object as a markup-language node in the markup-language document d. FIG. 4 presents a flow chart illustrating such a process. During the operation, a markup-language node n is first created from a GUI object (operation 402). The name of the GUI object can be used as the name of the node n. Next, the previously selected attributes of the GUI object are also added as attributes of node n (operation 406). For example, class information of the GUI object is added as a an attribute of node n. A markup-language node n is then successfully created (operation 408).

Figure 5:
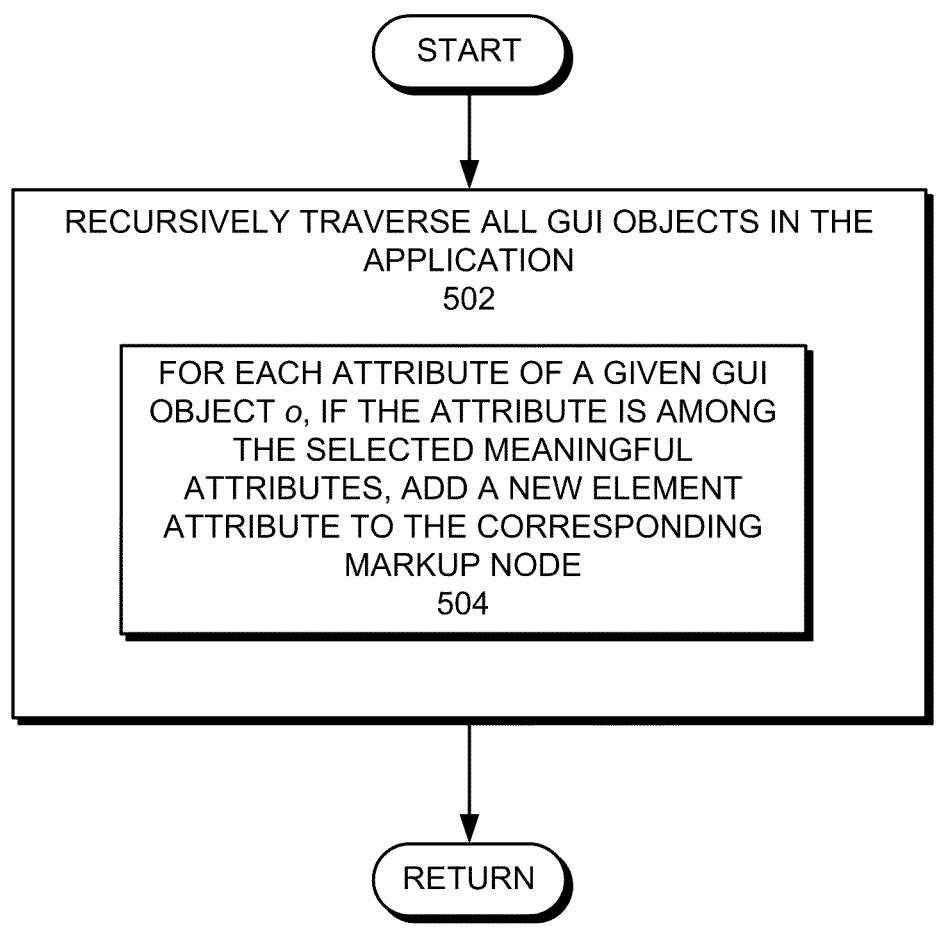
FIG. 5 presents a flow chart illustrating the process of recursively traversing the hierarchy of GUI objects in the application to form a markup-language hierarchy that can be queried in accordance with one embodiment of the present invention.

Note that a container-type GUI object may be present in a non-markup-language-presented application. A container-type object contains other GUI objects, which can also be container-type. In order to identify GUI objects in the container, the system recursively traverses all target GUI objects. FIG. 5 presents a flow chart illustrating the process of recursively traversing the hierarchy of GUI objects in the application to form a markup-language hierarchy that can be queried. During the traversal, the system recursively traverses all the GUI objects in the application (operation 502). In one embodiment, the system can use a depth-first searching method to traverse all the GUI objects. During a respective recursive traversal step, for each attribute of a given GUI object o, if this attribute is among the selected meaningful attributes (which can be used to identify the object), the system adds a new element attribute to the markup node corresponding to the GUI object (operation 504). In one embodiment, the system uses the name of the GUI object attribute as the name of the markup-node attribute, and uses the value of the GUI object attribute as the value of the markup-node attribute. As a result, all the target GUI objects with meaningful attributes are represented as markup-language nodes in a hierarchy that can be queried.

Figure 6:
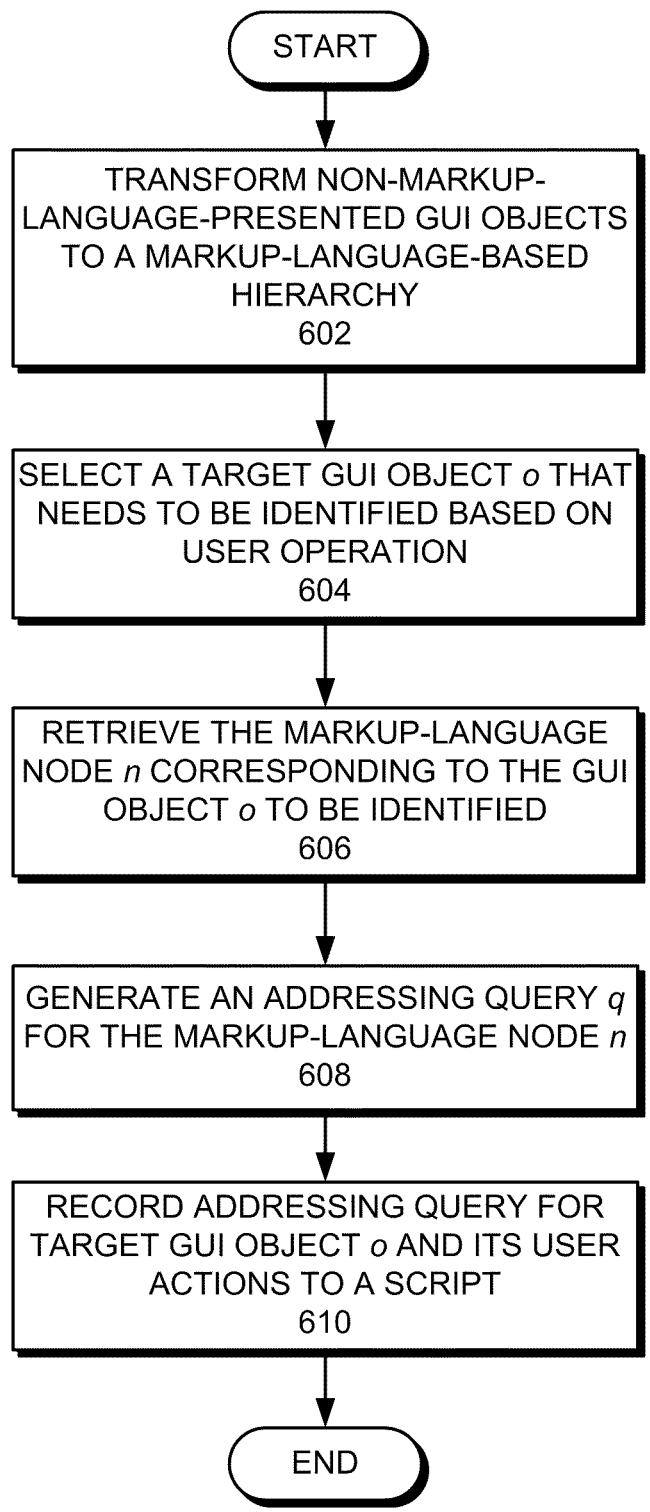
FIG. 6 presents a flow chart illustrating the process of generating an addressing query for a GUI object in accordance with one embodiment of the present invention.

FIG. 6 presents a flow chart illustrating the process of generating an addressing query for a GUI object, which in one embodiment can be the last step in the distinguishing phase. It is assumed that the system has transformed the non-markup-language-presented GUI objects in the application to a markup-language-based hierarchy (operation 602). The process illustrated in FIG. 5 can be applied to convert all target GUI objects into a markup-language document, such as a DOM document. The system first selects a target GUI object o in the application that needs to be identified based on user action (operation 604), and retrieves the corresponding markup-language node n in the markup-language document d (operation 606). Note that the GUI object n to be identified can be the object on which the user has performed an action (which is recorded in a script that can be played back during subsequent automated testing procedures). Next, the system generates an addressing query q for the markup-language node n, which can be executed later to search for the node that is associated with the target GUI object (operation 608). The query generation begins by retrieving a query rule set from a predefined document describing GUI-object-addressing query rules. Each query rule is then parsed to determine if it is applicable to the target GUI object. If more than one query is applicable, a unique query with the highest rank will be selected based on a ranking mechanism. For example, a query language called XML Path Language (XPath) can be used for selecting nodes from an XML document by a variety of criteria, such as strings, numbers, and Boolean values. Subsequently, the system the records addressing query for target GUI object o and its user actions to a script (operation 610).

After all target GUI objects in the original non-markup-language-presented application are converted to the markup-language-presented hierarchy, and the association map is built, each markup-language node (and the corresponding GUI object) can be correctly and uniquely identified by the generated addressing query. During GUI testing, the system records user actions on GUI objects performed by a tester. During the identifying phase, the system identifies target GUI objects on which the tester has previously performed user action and "replays" the recorded actions.

Figure 7:
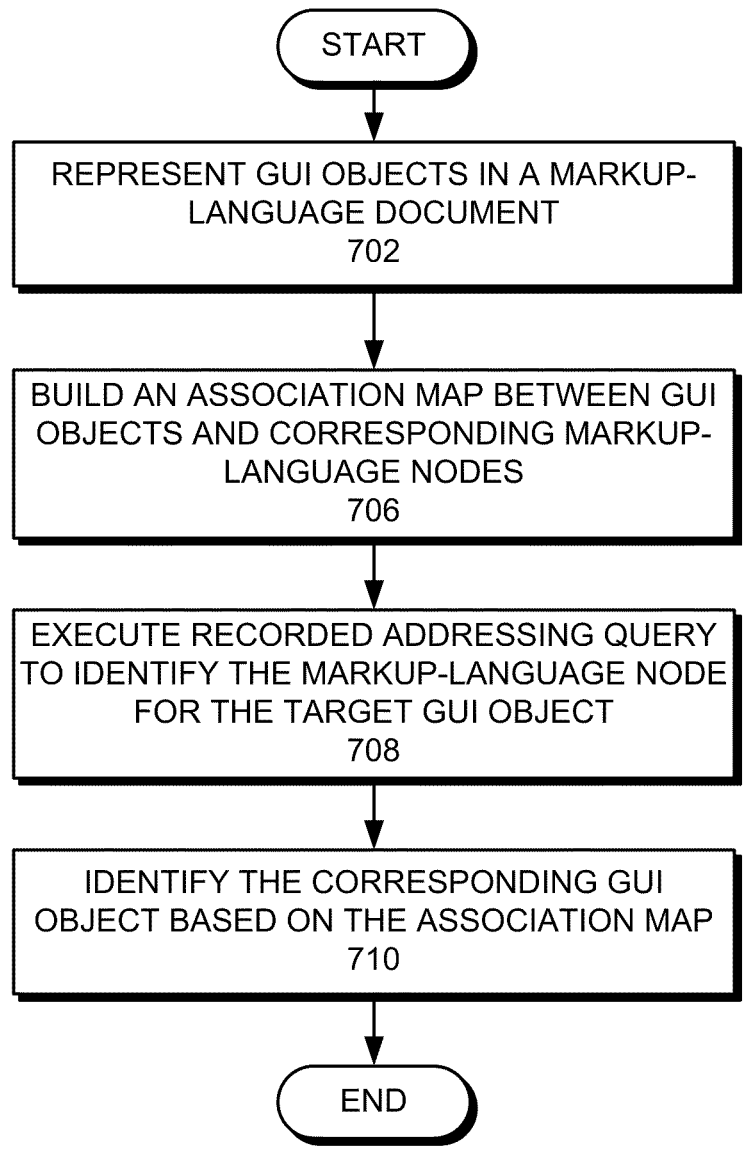
FIG. 7 presents a flow chart illustrating the process of identifying a target GUI object in accordance with one embodiment of the present invention.

The distinguishing phase is complete after successful generation of the addressing queries for each markup-language node, which corresponds to target GUI objects on which the user has performed some actions in the native application. FIG. 7 presents a flow chart illustrating the process of identifying of a target GUI object during the identifying phase when such user actions are replayed based on the recorded script. During operation, the system represents the GUI objects as markup-language nodes in a markup-language document (operation 702). Note that in one embodiment, the markup-language document is generated twice, once during the distinguishing phase and once during the identifying phase, so that the markup-language document can remain reliable against any changes incurred to the GUI objects. The system then builds an association map between the GUI objects and the corresponding markup-language nodes (operation 706). In one embodiment, the association map identifies a GUI object based at least on its memory address when the application is loaded into a computer's random access memory (RAM). Next, the system executes the addressing query for a target GUI object to identify the markup-language node (operation 708). Based on the association map built in operation 704, the target GUI object can be correctly and uniquely identified (operation 710).

Figure 8:
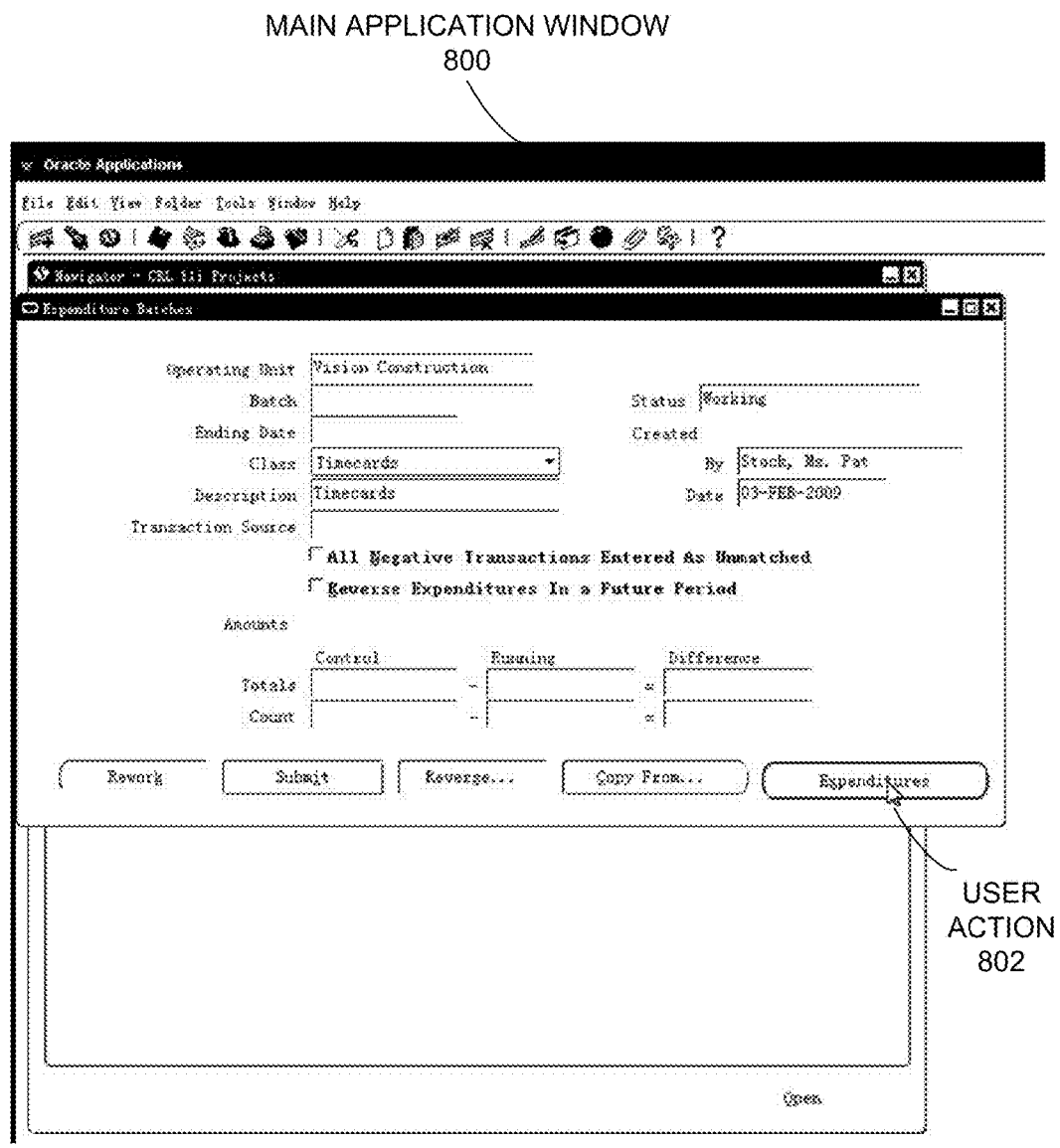
FIG. 8 presents an exemplary GUI containing multiple target objects to be identified in accordance with one embodiment of the present invention.

FIG. 8 presents an exemplary application GUI containing multiple target objects to be identified. A main application window 800 corresponds to the context root node in the markup-language-presented file. A user action 802 of clicking is performed on the "Expenditures" button, which is recorded in the user action script.

Figure 9:
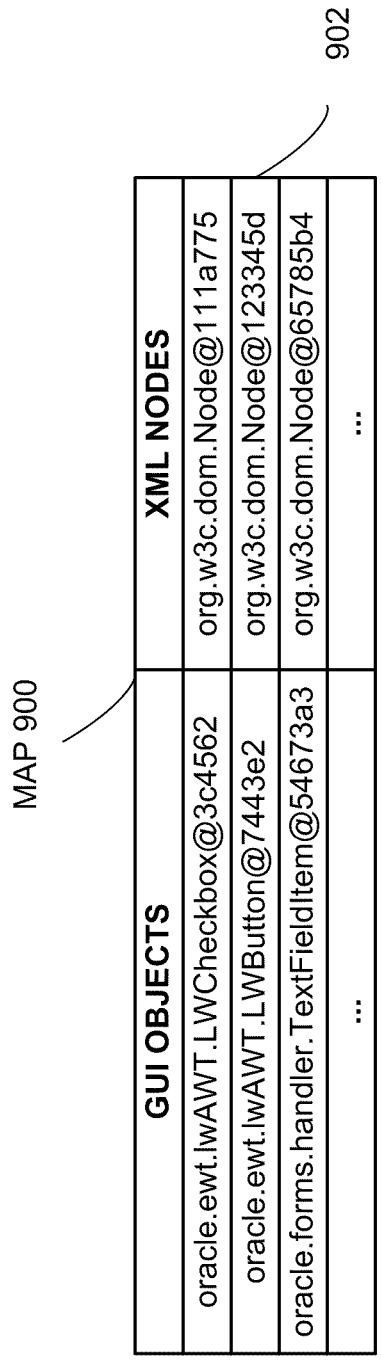
FIG. 9 presents an exemplary mapping table illustrating the mapping between GUI objects and the corresponding XML nodes in accordance with one embodiment of the present invention.

FIG. 9 presents an exemplary mapping table 900 illustrating the mapping between GUI objects and the corresponding XML nodes, which are one form of markup-language nodes, in accordance with one embodiment of the present invention. In mapping table 900, the left column indicates the GUI objects, and the right column indicates the corresponding XML element. For example, the left column of a row 902 records a button GUI object, which in one embodiment is uniquely identifiable by a hash code 0x7443e2 (a feature provided in the JAVA programming language), denoted as "oracle.ewt.IwAWT.LWButton@7443e2." This GUI object is mapped to an XML node uniquely identifiable by a hash code 0x123345d, as indicated by the right column of row 902. Note that embodiments of the present invention are not limited to using hash code to uniquely identify GUI objects and XML nodes, other identifying mechanisms, such as those based on memory addresses, can also be used.

FIG. 10 presents an XML document, which is one form of markup-language document that contains the converted markup-language nodes. An XML node 1002 of type "tabbedRegion" with the label of "Created" and name "GROUP_SUMMARY_TAB" is created under a container-type node 1004 which corresponds to a "GROUP_SUMMARY" window object.

Figure 11:
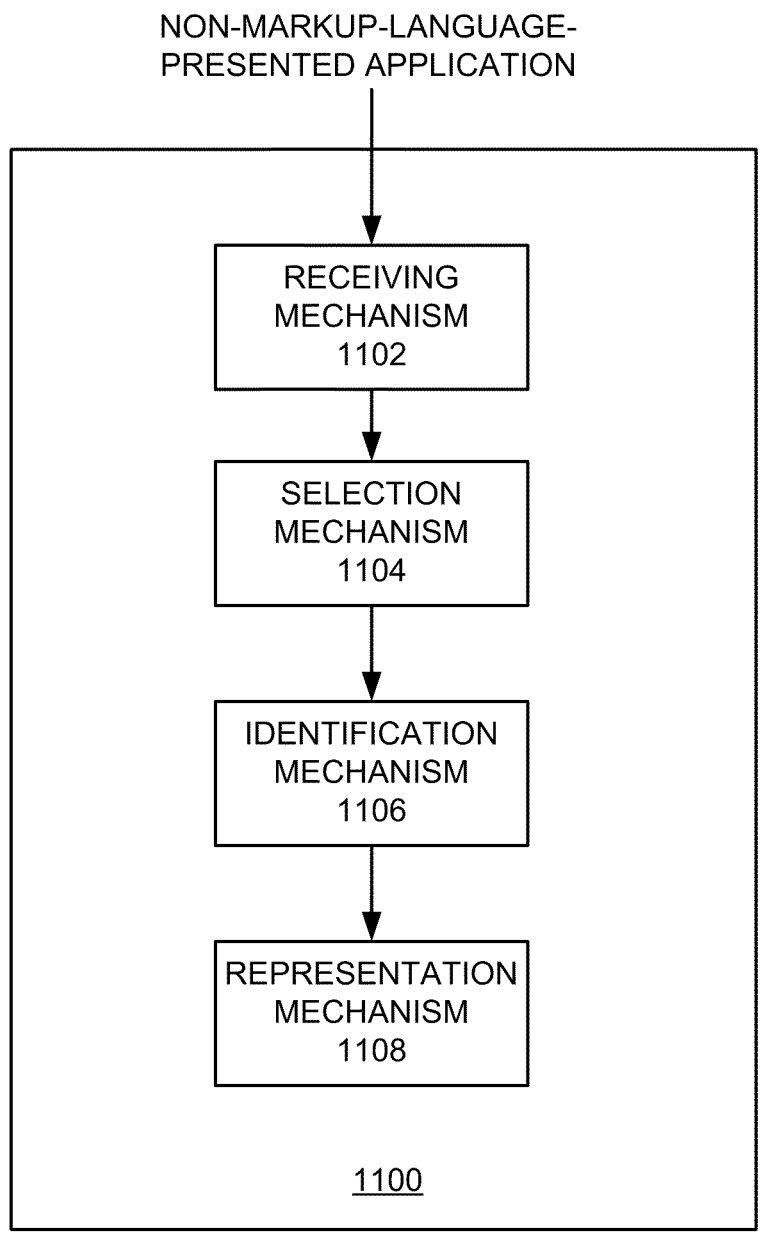
FIG. 11 presents a block diagram illustrating a system for identifying GUI objects in accordance with one embodiment of the present invention.

FIG. 11 presents a block diagram illustrating a system for converting GUI objects into a markup-language structure in accordance with one embodiment of the present invention. As shown in FIG. 11, a GUI object identification system 1100 includes a receiving mechanism 1102, a selection mechanism 1104, an identification mechanism 1106, and a representation mechanism 1108. During operation, receiving mechanism 1102 receives a non-markup-language-presented application. Selection mechanism 1104 selects or allows a user to select a set of objects attributes that can uniquely distinguish a target GUT object from others. In addition, identification mechanism 1106 identifies or allows a user to identify a set of meaningful target GUI objects in the application, and the representation mechanism 1108 converts the target GUI objects to markup-language nodes and stores them in a markup-language document, wherein each target GUI object is associated with a corresponding markup-language node in the structure.

Figure 12:
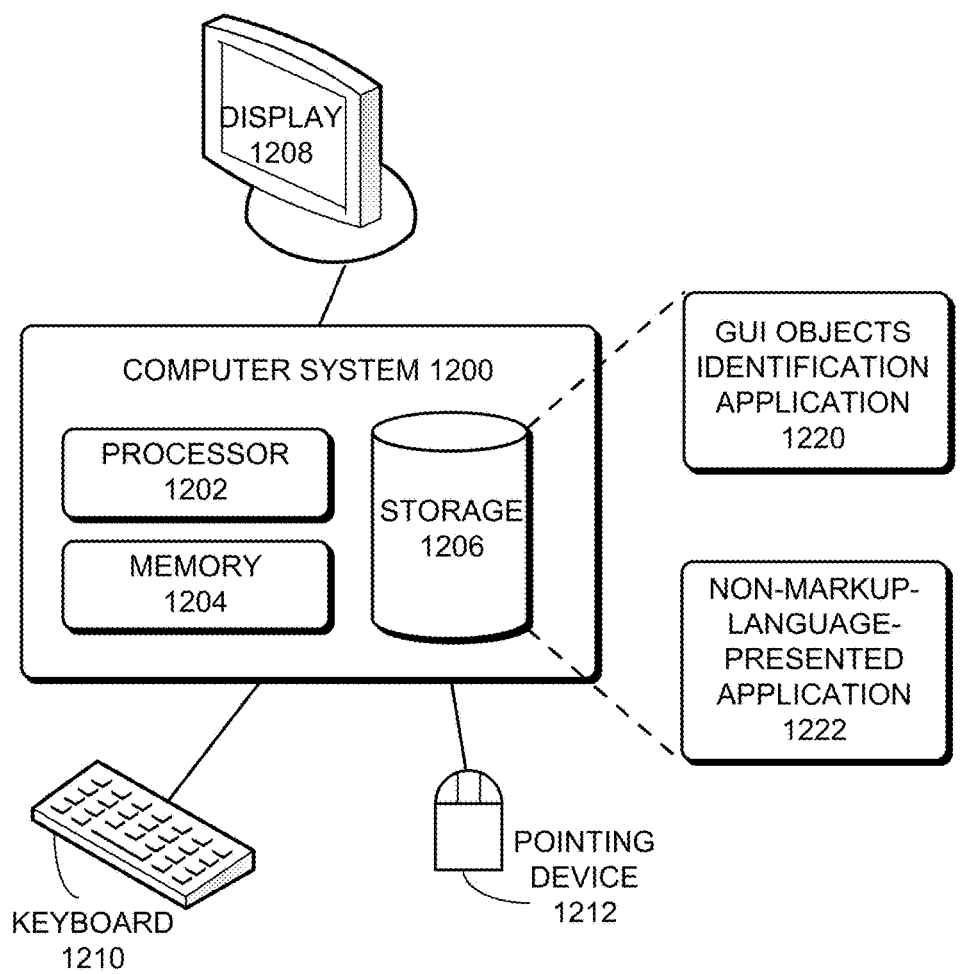
FIG. 12 illustrates an exemplary computer system for detecting online review bias in accordance with one embodiment of the present invention.

FIG. 12 illustrates an exemplary computer system for detecting online review bias in accordance with one embodiment of the present invention. In one embodiment, a computer system 1200 includes a processor 1202, a memory 1204, and a storage device 1206, and is coupled to an optional display 1208, keyboard 1210, and pointing device 1212. Storage device 1206 stores a GUI objects identification application 1220, as well as other applications, such as non-markup-language-presented applications 1222. During operation, GUI object identification application 1220 is loaded from storage device 1206 into memory 1204 and then executed by processor 1202. While executing the program, processor 1202 performs the aforementioned methods.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, ASICs, FPGAs, and other programmable-logic devices now known or later developed. When the hardware modules are activated, the hardware modules perform the methods and processes included within the hardware modules.

What is claimed is:

1. A computer-executed method, comprising:
identifying, by a computer system, a set of target graphical user interface (GUI) objects in a non-markup-language-presented application, wherein a respective GUI object of the set of target GUI objects is not represented in a markup language;
generating a markup-language-based structure which includes one or more markup-language nodes that each specifies distinguishing attributes of a respective target GUI object in the non-markup-language-presented application, wherein generating the markup-language-based structure comprises:
determining a context root for the non-markup-language-presented application, wherein the context root serves as an entry point of a hierarchy of GUI objects and traversing the hierarchy of GUI objects starting from the context root while generating markup-language-based structure supports recording of user actions on the set of target GUI objects in the hierarchy of GUI objects;
converting the context root to a markup-language root node;
appending the context root to a new document; and
forming a hierarchy of nodes by performing operations including:
traversing the set of target GUI objects;
generating a markup-language node based on a respective target GUI object; and
adding the markup-language node to the new document;
generating addressing queries for selecting, from the markup-language-based structure, nodes corresponding to GUI objects that are to be identified;
generating an association map that maps each GUI object of the non-markup-language-presented application to a respective markup-language node;
generating a user action script, which involves:
responsive to a target GUI object being operated on, issuing a respective addressing query to the markup-language-based structure to select a markup-language node corresponding to the target GUI object being operated on, wherein each node of the markup-language-based structure is previously generated from a different corresponding GUI object of the non-markup-language-presented application;

identifying the target GUI object based on an entry of the association map corresponding to the selected markup-language node; and recording, in the user action script, the addressing query and the user actions performed on the target GUI object; and performing playback of the user action script to emulate recorded the user operations by executing one or more addressing queries against the markup-language-based structure, thereby identifying one or more GUI objects that have been previously operated and repeating the recorded user operations in the playback.

2. The method of claim 1, wherein the non-markup-language-presented application is rendered on the GUI, without using a markup language representation for the set of target GUI objects.

3. The method of claim 1, wherein converting the target GUI object to a markup-language node comprises:
   naming the node with the name of the target GUI object; and setting attributes for the node based at least on class information and properties of the target GUI object.

4. The method of claim 1, wherein at least one target GUI object is a container type object that contains other GUI objects.

5. The method of claim 1, further comprising updating the markup-language-based structure and the association map to reflect changes to the non-markup-language-presented application's GUI objects.

6. The method of claim 1, wherein generating a markup-language-based structure further comprises:
   determining, without receiving user input at a respective GUI object, that the respective GUI object in the set of GUI objects allows a user to perform an action on the respective GUI object when interacting with a GUI; and
   in response to the determining, generating a new node in the markup-language-based structure corresponding to the respective GUI object, wherein the respective GUI object does not correspond to any previously generated node in the markup-language-based structure.

7. A non-transitory computer-readable storage medium storing instructions which when executed by a particular machine cause the machine to perform a method, the method comprising:
   identifying a set of target graphical user interface (GUI) objects in a non-markup-language-presented application, wherein a respective GUI object of the set of target GUI objects is not represented in a markup language;
   generating a markup-language-based structure which includes one or more markup-language nodes that each specifies distinguishing attributes of a respective target GUI object in the non-markup-language-presented application, wherein generating the markup-language-based structure comprises:
   determining a context root for the non-markup-language-presented application, wherein the context root serves as an entry point of a hierarchy of GUI objects and traversing the hierarchy of GUI objects starting from the context root while generating markup-language-based structure supports recording of user actions on the set of target GUI objects in the hierarchy of GUI objects;
   converting the context root to a markup-language root node;
   appending the context root to a new document; and forming a hierarchy of nodes by performing operations including:
   traversing the set of target GUI objects;
   generating a markup-language node based on a respective target GUI object; and
   adding the markup-language node to the new document;
generating addressing queries for selecting, from the markup-language-based structure, nodes corresponding to GUI objects that are to be identified;
generating an association map that maps each GUI object of the non-markup-language-presented application to a respective markup-language node;
generating a user action script, which involves:
responsive to a target GUI object being operated on, issuing a respective addressing query to the markup-language-based structure to select a markup-language node corresponding to the target GUI object being operated on, wherein each node of the markup-language-based structure is previously generated from a different corresponding GUI object of the non-markup-language-presented application;
identifying the target GUI object based on an entry of the association map corresponding to the selected markup-language node; and
recording, in the user action script, the addressing query and the user actions performed on the target GUI object; and
performing playback of the user action script to emulate the recorded user operations by executing one or more addressing queries against the markup-language-based structure, thereby identifying one or more GUI objects that have been previously operated and repeating the recorded user operations in the playback.

8. The computer-readable storage medium of claim 7, wherein the non-markup-language-presented application is rendered on the GUI, without using a markup language representation for the set of target GUI objects.

9. The computer-readable storage medium of claim 7, wherein converting the target GUI object to a markup-language node comprises;
   naming the node with the name of the target GUI object; and setting attributes for the node based at least on class information and properties of the target GUI object.

10. The computer-readable storage medium of claim 7, wherein at east one target GUI object is a container type object that contains other GUI objects.

11. A computer system, the system comprising:
   a processor; a memory;
   an identification mechanism configured to identify a set of target graphical user interface (GUI) objects in a non-markup-language-presented application, wherein a respective GUI object of the set of target GUI objects is not represented in a markup language;
   a representation mechanism configured to generate a markup-language-based structure which includes one or more markup-language nodes that each specifies distinguishing attributes of a respective target GUI object in the non-markup-language-presented application, wherein generating the markup-language-based structure comprises:
   determining a context root for the non-markup-language-presented application, wherein the context root serves as an entry point of a hierarchy of GUI objects and traversing the hierarchy of GUI objects starting from the context root while generating markup-languagebased structure supports recording of user actions on the set of target GUI objects in the hierarchy of GUI objects;

converting the context root to a markup-language root node;

appending the context root to a new document; and forming a hierarchy of nodes by performing operations including:
    traversing the set of target GUI objects;
    generating a markup-language node based on a respective target GUI object; and adding the markup-language node to the new document;

a generation mechanism configured to generate addressing queries for selecting, from the markup-language-based structure, nodes corresponding to GUI objects that are to be identified;

wherein the representation mechanism is further configured to generate an association map that maps each GUI object of the non-markup-language-presented application to a respective markup-language node;

wherein the computer system further comprises an identification mechanism configured to generate a user action script, wherein generating the user action script involves:

responsive to a target GUI object being operated on, issuing a respective addressing query to the markup-language-based structure to select a markup-language node corresponding to the target GUI object being operated on, wherein each node of the markup-language-based structure is previously generated from a different corresponding GUI object of the non-markup-language-presented application identifying the target GU object based on an entry of the association map corresponding to the selected markup-language node; and recording, in the user action script, the addressing query and the user actions performed on the target GUI object; and performing playback of the user action script to emulate the recorded user operations by executing one or more addressing queries against the markup-language-based structure, thereby identifying one or more GU objects that have been previously operated and repeating the recorded user operations in the playback.

12. The computer system of claim 11, wherein the non-markup-language-presented application is rendered on the GUI, without using a markup language representation for the set of GUI objects.

13. The computer system of claim 11, wherein the second conversion mechanism comprises:
    a naming mechanism configured to name the node with the name of the target GUI object; and
    an attribute-setting mechanism configured to set attributes for the node based at least on class information and properties of the target GUI object.

14. The computer system of clam 11, wherein at least one target object is a container type object that contain other GUI objects.

15. The computer system of claim 11, further comprising a receiving mechanism configured to receive a non-markup-language-presented application, wherein the non-markup-language-presented application includes a set of target GUI objects that are not represented in a markup language.

16. The computer system of claim 11, further comprising a selecting mechanism configured to select a set of attributes that uniquely distinguish the target GUI object of the non-markup-language-presented application.

\* \* \* \* \*

UNITED STATES PATENT AND TRADEMARK OFFICE
CERTIFICATE OF CORRECTION

| | | |
|---|---|---|
| PATENT NO. | : 9,760,347 B2 | Page 1 of 1 |
| APPLICATION NO. | : 12/501016 | |
| DATED | : September 12, 2017 | |
| INVENTOR(S) | : Wang et al. | |

It is certified that error appears in the above-identified patent and that said Letters Patent is hereby corrected as shown below:

In the Drawings

On sheet 3 of 12, in FIG. 3, under Reference Numeral 306, Line 1, delete "MARKUP-LANGUGE" and insert -- MARKUP-LANGUAGE --, therefor.

In the Specification

In Column 5, Line 36, before "an attribute" delete "a".

In Column 7, Line 34, delete "GUT" and insert -- GUI --, therefor.

In the Claims

In Column 10, Line 42, In Claim 9, delete "comprises;" and insert -- comprises: --, therefor.

In Column 10, Line 47, In Claim 10, delete "east" and insert -- least --, therefor.

In Column 11, Line 31, In Claim 11, after "application" insert -- ; --.

In Column 11, Line 32, In Claim 11, delete "GU" and insert -- GUI --, therefor.

In Column 12, Line 7, In Claim 11, delete "GU" and insert -- GUI --, therefor.

In Column 12, Line 22, In Claim 14, delete "clam" and insert -- claim --, therefor.

In Column 12, Line 23, In Claim 14, after "target" insert -- GUI --.

In Column 12, Line 23, In Claim 14, delete "contain" and insert -- contains --, therefor.

Signed and Sealed this
Twenty-second Day of May, 2018

Andrei Iancu
*Director of the United States Patent and Trademark Office*